Aug. 8, 1950 LE ROY APKER 2,518,113

ULTRA HIGH FREQUENCY RECEIVER

Filed June 23, 1945

Inventor:
LeRoy Apker,
by Harry E. Dunham
His Attorney.

Patented Aug. 8, 1950 2,518,113

UNITED STATES PATENT OFFICE 2,518,113

ULTRA HIGH FREQUENCY RECEIVER

Le Roy Apker, Niskayuna, N. Y., assignor to General Electric Company, a corporation of New York Application June 23, 1945, Serial No. 601,124

5 Claims. (Cl. 250—20)

Figures 1, 2, 3, 4:
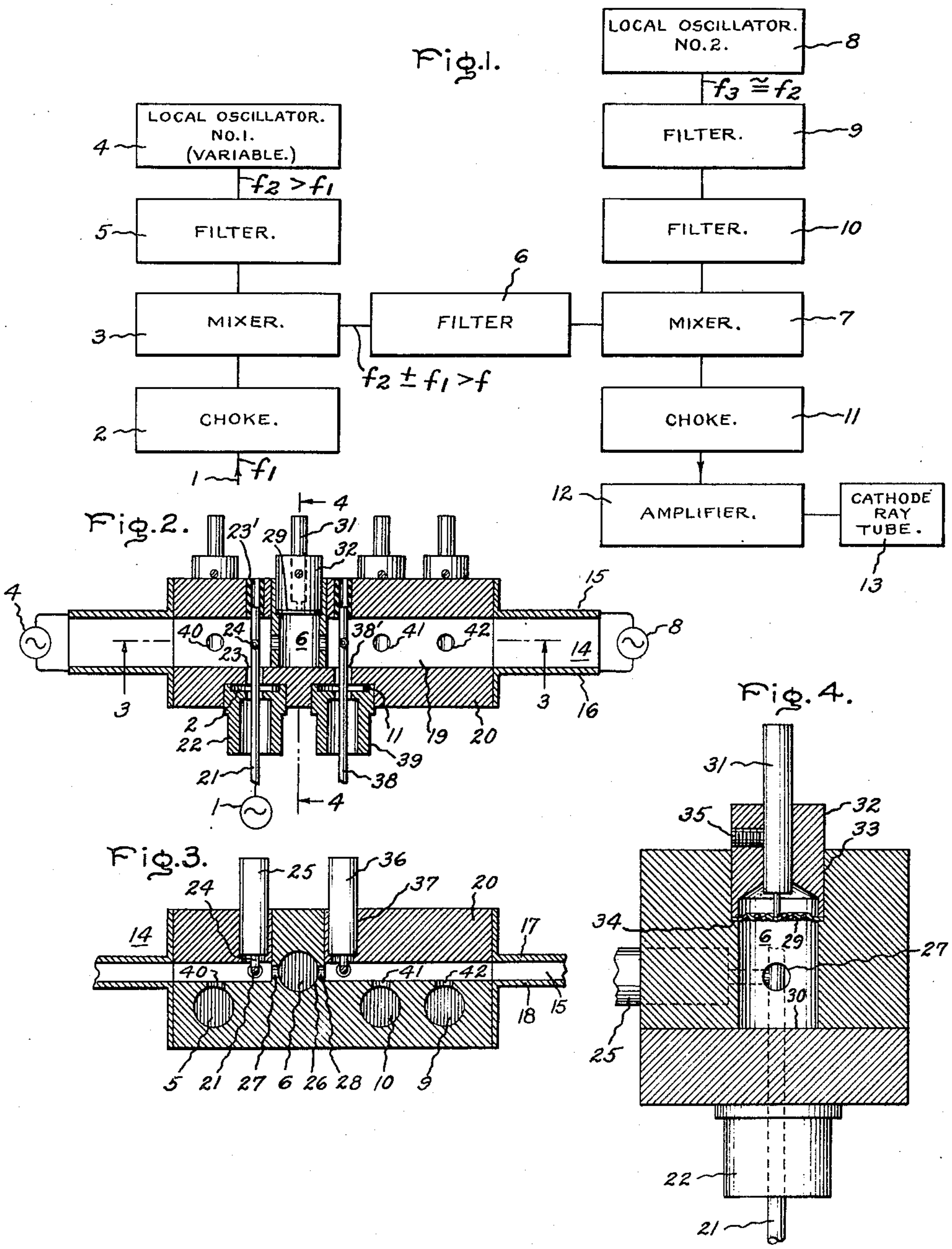

My invention relates to ultra high frequency apparatus and it has for its primary object to provide new and improved means and methods for analyzing ultra high frequency waves.

The usual wide band ultra high frequency receiver for spectrum analysis is of the superheterodyne type and provides frequency conversion in the first stage of the receiver. It is a characteristic of such a receiver that for each single-frequency signal applied to the input, responses are found when the receiver is tuned not only to the signal frequency but also to various other frequencies. The number and exact values or positions in the frequency spectrum of these responses depend on the specific values of the structural components of the receiver. The usual receiver of this type has two (the signal and its image) and frequently has several other responses for each incident frequency, so that it is often difficult to discriminate between genuine and spurious responses. Accordingly, it is an object of the present invention to provide a new and improved wide band ultra high frequency spectrum analyzer for determining the characteristics of a received wave and in which, over any practical range of received signal frequencies, spurious responses in the output are minimized.

It is another object of my invention to provide a new and improved wide band ultra high frequency signal converter which is both simple in construction and reliable in operation. The converter minimizes spurious responses over a wide range of frequency without requiring tuning elements resonant in this range. In this way, the usual tuners placed ahead of superheterodyne converters (for example) for rejection of spurious responses are eliminated.

One of the features of my invention is the employment, in an instrument for analyzing the spectrum of a wide band of ultra high frequencies, of a source of oscillations considerably higher in frequency than the signals to be analyzed. This source is variable over a range as broad in megacycles as the frequency spectrum to be covered. Two stages of frequency conversion are connected through means for filtering the signals at the output of the first stage of conversion to remove undesired modulation products. The signal produced at the output of the second stage is of a constant frequency having a value such that it can be amplified in conventional amplifier circuits.

The features of the invention which I desire to protect herein are pointed out with particularity in the appended claims. The invention itself, together with further objects and advantages thereof, may best be understood by reference to the following description taken in connection with the accompanying drawing in which Fig. 1 is a block diagram illustrating the component parts of an ultra high frequency receiver suitably embodying my invention; Fig. 2 is a horizontal section of my ultra high frequency apparatus; Fig. 3 is a vertical section taken along the line 3—3 of Fig. 2; and Fig. 4 is an enlarged transverse section taken along the line 4—4 of Fig. 2.

The receiver circuit in Fig. 1 comprises a source of input signals 1 which may be for example signals received by an antenna and varied over a wide frequency range, such as from 10 to 3500 megacycles, and which are supplied through a choke 2 to a first mixer or frequency converter 3. Locally generated oscillations of a frequency $f2$ considerably higher than the frequency $f1$ of the received signals, for example in the centimeter wave region, and varying over a range which is at least as broad (in magacycles) as the range of the received signals, are supplied from a variable frequency local oscillator 4 through a rejection filter 5 to the mixer or frequency converter 3. The converted output signals of the mixer 3, which are signals of a constant, very high frequency, are supplied through a sharply tuned transmission filter 6 to a second mixer or frequency converter 7. Local oscillations are likewise supplied to the mixer 7 from a second local oscillator 8 through a pair of rejection filters 9, 10. The frequency $f3$ of the oscillations of the oscillator 8 is of the same order as that of the oscillator 4. It is separated from the constant frequency output signal of mixer 3 by a frequency difference such that the constant frequency output signal of the mixer 7 is of an order such that the amplifier 12 may be conventional in character. This output signal has a constant frequency value considerably lower than the tuned frequency of the oscillators 4 and 8 and lower than the constant frequency output signal of mixer 3. The output of the amplifier 12 may be supplied to any output means, such as a cathode ray tube 13, to measure or otherwise determine or display the frequency of the input signal 1.

In the circuit of Fig. 1, the filters 5, 6 and 10 are all tuned to the frequency of the constant frequency signal obtained through the frequency conversion action of the mixer 3, that is, for example the difference between the frequency of the oscillations from oscillator 4 and that of the input waves supplied from the source 1. The filters 5 and 10 respectively are so positioned relative to the mixers 3, 7 that they function to prevent waves of the frequency to which they are tuned from being lost or dissipated in the lines from the local oscillator 4 and local oscillator 8 to the mixers 3 and 7 respectively. The filter 6 being tuned to the same frequency permits waves of the frequency of the useful output of mixer 3 to travel to the mixer 7 without appreciable hindrance and prevents waves of other frequencies (such as the unwanted modulation products of mixer 3) from reaching mixer 7. The filter 6 also prevents any appreciable amount of power from oscillator 8 from reaching mixer 3. The filter 9 is tuned to a frequency determined by the frequency of oscillator 8 and the low frequency output wave of the mixer 7. Thus if the frequency of oscillator 8 is less than the constant frequency wave provided by mixer 3, the tuned frequency of filter 9 is equal to the difference between the frequency of oscillator 8 and the constant output frequency supplied by mixer 7 to the amplifier 12. Filter 9 therefore, when properly located, is effective to prevent waves of this particular frequency from being accepted for conversion by mixer 7 should filter 6 leak slightly to transmit waves of the frequency. The filter 6, being a sharply tuned transmission filter, prevents waves of the frequency of oscillator 8 from reaching mixer 3 to give any spurious responses.

The nature and operation of the wide band ultra high frequency analyzer may become more evident from a consideration of the structure of the apparatus illustrated in Figs. 2–4 jointly. The variable ultra high frequency oscillator 4 and the fixed ultra high frequency oscillator 8 are connected to opposite ends of a rectangular wave guide 14 for transmission of a wave of the $TE_{01}$ mode. The guide 14 comprises a pair of side walls 15, 16, a top wall 17, and a bottom wall 18. A central portion 19 of the wave guide may be formed by cutting a rectangular slot in a metallic block member 20. Preferably, the metallic block and the end sections of the wave guide 14 are formed of a good conductive material such as copper. Input signals 1 are supplied over a coaxial transmission line having an inner conductor 21 and a tubular outer conductor 22 to the central portion of the wave guide through a lateral opening 23 therein. To this end the inner conductor 21 extends across the wave guide and has its opposite end supported in a dielectric sleeve 23' positioned within an opening in the wall 15 of the wave guide opposite the opening 23. At approximately the middle of its extension across the wave guide the conductor 21 is connected to a stub connector 24 which extends vertically upward into a first mixer 25. The mixer 25 may be any suitable device having a nonlinear current-voltage characteristic and frequency conversion properties, such as for example a germanium crystal. The outer conductor 22 is constricted near its point of connection with the opening 23 in wall 16 of the wave guide and the choke 2 is formed by a radial slot in this constricted portion of the conductor 22.

The crystal 25 which in conjunction with the stub 24 comprises the mixer 3 of the circuit of Fig. 1, effects conversion of the input signal 1 and the high frequency oscillations from the oscillator 4 to provide a constant frequency signal which is transmitted longitudinally through the wave guide 14. Disposed in the path of the traveling wave is the transmission filter 6 which is of the cavity resonator type and comprises a transverse cylindrical opening 26 in the block 20 having a pair of apertures 27, 28, communicating respectively with the left- and right-hand ends of the wave guide 14. Means are provided for tuning the transmission filter 6 to resonance at the frequency of the constant frequency wave supplied from the mixer 3 and comprises a corrugated metallic diaphragm 29, as seen in the enlarged view of Fig. 4, which forms one end wall for the opening 26. Means are provided as best shown in Fig. 4 for adjusting the position of the flexible end wall 29 with respect to the opposing end wall 30 to tune the transmission filter to the frequency of the constant frequency wave provided by the previously-mentioned mixing action. This comprises a positionable rod 31 connected at one end to the diaphragm 29 and having its other end extending externally of a sleeve member 32 which fits into an enlarged portion 33 of the opening 26. The inner end of the member 32 abuts against a shoulder 34 formed at the junction of the cylindrical openings 33 and 26. The metallic diaphragm 29 may be maintained in an adjustable position by means of a set screw 35 which engages the rod 31.

The constant frequency wave which is supplied to the right-hand end of the wave guide 14 through the aperture 28 in the transmission filter 6 is mixed with the ultra high frequency oscillations from the source 8 through the action of a second nonlinear mixing device 36 which may also be a germanium crystal. The crystal 36 is supported in a vertical opening 37 in block 20 to provide a constant frequency wave of relatively low frequency which is supplied through a coaxial line, comprising an inner conductor 38 extending transversely across the wave guide 15 below the crystal 36 and a tubular outer conductor 39, to the amplifier 12, as shown in Fig. 1. The choke 11 suppresses flow of the ultra high frequency waves of the frequency of oscillator 8 and transmission filter 6 through the lateral opening 38' and along the transmission line conductors 38, 39. The choke 11 is formed by a radial slot whose construction is substantially the same as the radial slot 2 previously described.

The rejection filters 5, 9, 10 are cavity resonators similar in construction to the transmission filter 6, each employing a transverse hole in the block 20. In the case of the rejection filters 5, 9, 10 however, the transverse holes are as best illustrated in Fig. 3 located below the bottom wall 18 of the wave guide and are connected respectively with the wave guide through apertures 40, 41, 42. The apertures 40, 41 are spaced with respect to the crystals 25, 36 by a distance determined by the phase of reflected energy from these crystals so that the respective rejection filter functions as a series open circuit connection for the constant useful output frequency of the crystal mixer 25. In this way they prevent waves of this frequency from reaching the portions of guide 14 connected to oscillators 4, 8 and permit efficient output from rectifier 25 and efficient pickup by crystal 36. The aperture 42 is so located relative to the crystal 36 that it functions to place a short-circuit across the crystal for the frequency to which the rejection filter 9 is tuned.

In the operation of my spectrum analyzer, the incoming signals from the source 1, which may be of any frequency in the range from 10 to 3500 megacycles, are mixed through the action of the crystal 25 with oscillations from the source 4 to provide a constant frequency signal. This constant frequency signal is filtered by the transmission filter 6 to remove undesired modulation products and supplied to the crystal 36 where it is mixed with oscillations from the source 8 to produce a constant frequency output signal of relatively low frequency which is supplied to the amplifier 12. The oscillator 4 is variable in character and is varied over its tuning range, which may be from 22,000 to 25,500 megacycles, until the mixed signal produced by the crystal 25 is of the frequency to which the transmission filter 6 is tuned. When the frequencies of the source 1 and the oscillator 4 are thus correlated, a constant ultra high frequency signal is provided by crystal 25. This signal passes through transmission filter 6 and is combined by crystal 36 with oscillations from oscillator 8. These oscillations are of ultra high frequency, for example 21,885 megacycles. The crystal 36 combines the two ultra high frequency waves to form a constant low frequency signal which is supplied over the transmission line 38, 39 to the amplifier 12 so that an indication is obtained on the cathode ray tube 13 or any other suitable output device. The rejection filter 5 reflects the constant frequency signal obtained through the action of the crystal 25 in proper phase so that this signal is not lost in the guide section connecting with oscillator 4, but is transmitted efficiently to element 36. Similarly, the rejection filter 10 prevents transmission to the oscillator 8 of the constant frequency signal transmitted through the transmission filter 6 and permits efficient pickup and conversion by crystal 36. The filter 9 short-circuits the crystal 36 for undesired modulation products of crystal 25 that leak through filter 6.

From the foregoing explanation, it is seen that an important advantage of my spectrum analyzer is that it allows the detection of input frequencies over a wide range and simply through the tuning of the oscillator 4 alone, which may be effected by a simple tuning knob, supplies to the amplifier 12 a constant frequency signal. At the same time, undesired modulation products which might otherwise produce spurious responses are suppressed through the filtering action of the filters 5, 6, 9, and 10. It is thus apparent that a single full strength response for a given input signal is obtained if the oscillator 4 is tuned through its complete range, all other responses requiring at least a 30 db. larger input. Another advantage of my invention is that the filters required are simple in character and at the high frequencies employed, are quite sharp in action and have a high Q.

It is well known that in frequency conversion apparatus utilizing crystals as a frequency converting medium, the crystals must be operated under efficient conditions in order to prevent loss of received signals. To that end it is essential that proper termination of the wave transmitting channel be provided for the various frequency waves present in the crystal circuits. This is achieved in my improved circuits by means of the filters 5, 6, 9, and 10 and by means of the chokes 2 and 11, which so terminate the respective portions of the wave transmission channel that no received energy is dissipated through improper termination. As a result, good conversion efficiency is obtained in each of the crystals 25, 36.

While in the foregoing I have described my invention as applicable to an ultra high frequency spectrum analyzer, it is apparent that the invention may be employed to analyze lower frequency waves, one of the requirements being the use of an oscillator variable over a frequency range of cycles or kilocycles equal to the range of frequencies to be covered by the analyzer. It is apparent likewise that when used for lower frequencies the filters of the system which are employed may be different in form from those illustrated in the figures of the drawing. Furthermore, by the use of suitable pretuning circuits before supplying an input wave to a first mixer of the analyzer, further rejection of undesired signals is obtained.

While I have shown and described my invention by reference to a particular embodiment thereof, it will be understood that numerous modifications may be made by those skilled in the art without departing from the invention. I therefore aim in the appended claims to cover all such equivalent variations as come within the true spirit and scope of my invention.

What I claim as new and desire to secure by Letters Patent of the United States, is:

1. Apparatus for determining the frequency of an ultra high frequency wave comprising a metallic wave guide of the hollow pipe type, a pair of oscillators connected respectively to opposite ends of said guide for supplying thereto oscillations of a frequency substantially larger than the frequency of said wave, a pair of nonlinear devices connected across said guide at spaced points, filtering means comprising a cavity resonator positioned transverse said guide between said points, said resonator having apertures communicating with said guide on opposite sides of said resonator, means for supplying said wave to said guide on one side of said filtering means, and output means connected to said guide on the other side of said filtering means.

2. An ultra high frequency receiver comprising a metallic wave guide of the hollow pipe type, a pair of oscillators connected respectively to opposite ends of said guide for supplying thereto oscillations of a frequency substantially larger than the frequency of a received wave, a pair of nonlinear devices connected across said guide at spaced points, filtering means comprising a cavity resonator positioned transverse said guide between said points, said resonator having apertures communicating with said guide on opposite sides of said resonator, means supplying said wave to said guide on one side of said filtering means, output means connected to said guide on the other side of said filtering means, and additional cavity resonators connected across said guide between each of said nonlinear devices and the one of said oscillators adjacent thereto.

3. A receiver for high frequency signals varying over a wide range of high frequency comprising a metallic wave guide of the hollow pipe type, a first source of oscillations of a frequency higher than the frequency of said signals connected to said wave guide at one end thereof, means for supplying received signals to said guide at a point adjacent said one end, means for combining said received signals with said oscillations to produce a converted signal of constant high frequency, a second source of oscillations having a frequency of the order of the frequency of said first oscillations connected to said wave guide at its other end, means including a cavity resonator connected across said guide between said converting means and said second source for removing undesired modulation products from said converted signal, and means for combining said converted signal with said second oscillations to produce a second converted signal of lower constant frequency.

4. A receiver for signals varying over a wide range of ultra high frequencies comprising a metallic wave guide of the hollow pipe type, a first source of oscillations of a frequency higher than any frequency in said range connected to one end of said guide, the frequency of said first source being variable over a second range equal in width to said first range, a second source of constant frequency oscillations of a frequency higher than any frequency of said first range connected to said guide at its other end, filtering means comprising a cavity resonator positioned transverse said guide at a point between said ends, said resonator having apertures communicating with said guide on opposite sides of said resonator, means for supplying said signals to said guide at a point between said filtering means and said first source, mixing means connected across said guide between said filtering means and said first source to combine said signals and oscillations of said first source to produce a constant frequency wave, said filtering means being tuned to the frequency of said wave, a second mixing means connected to said guide between said filtering means and said second source to produce a constant frequency output signal determined by the frequency of said wave and oscillations of said second source, and output means connected to said guide between said filtering means and said second source.

5. A receiver for signals varying over a wide range of ultra high frequencies comprising a wave guide of the hollow pipe type, a variable oscillator connected to said guide at one of its ends and a constant frequency oscillator connected to said guide at its other end, first filtering means comprising a cavity resonator positioned transverse said guide at a point between said ends, said resonator having apertures communicating with said guide on opposite sides of said resonator, means for supplying said signals to said guide between said variable oscillator and said filtering means, a first crystal rectifier connected across said guide for mixing said oscillations from said variable oscillator and said signals to produce a constant frequency wave, said filtering means being tuned to the frequency of said wave, a second cavity resonator connected between said first crystal rectifier and said variable oscillator to prevent loss of said wave, a second crystal rectifier connected between said first filtering means and said constant frequency oscillator to produce an output signal determined by the frequency of said wave and said constant frequency oscillations, a third cavity resonator connected between said second crystal rectifier and said constant frequency oscillator to prevent said wave from reaching said constant frequency oscillator, and output electrode means connected to said guide between said first and third cavity resonators.

LE ROY APKER.

REFERENCES CITED

The following references are of record in the file of this patent:

UNITED STATES PATENTS

| Number | Name | Date |
|---|---|---|
| 2,142,159 | Southworth et al. | Jan. 3, 1939 |
| 2,154,073 | Koch | Apr. 11, 1939 |
| 2,245,385 | Carlson | June 10, 1941 |
| 2,253,589 | Southworth | Aug. 26, 1941 |
| 2,260,844 | Thomas | Oct. 28, 1941 |
| 2,378,944 | Ohl | June 26, 1945 |